United States Patent Office 3,222,036
Patented Dec. 7, 1965

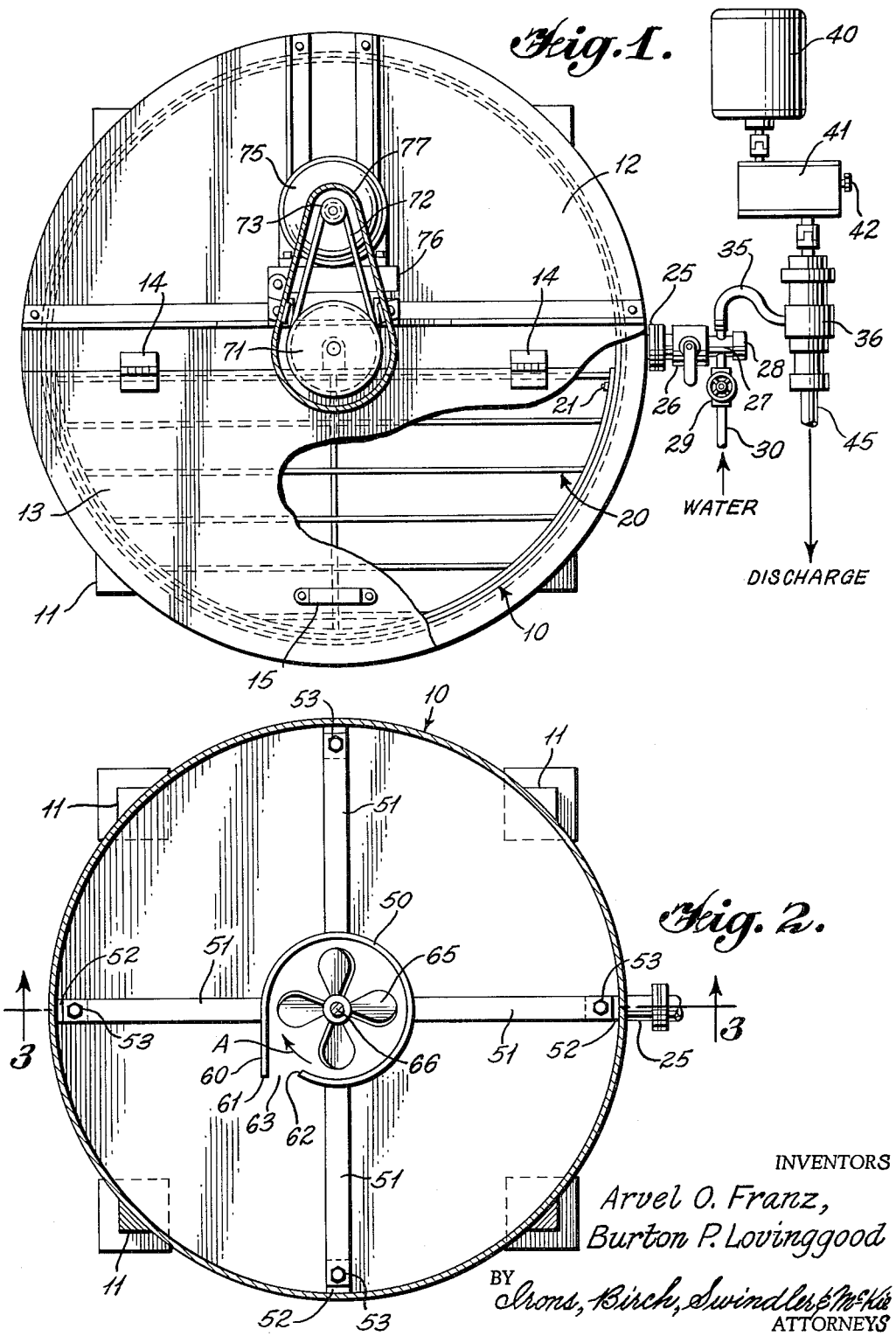

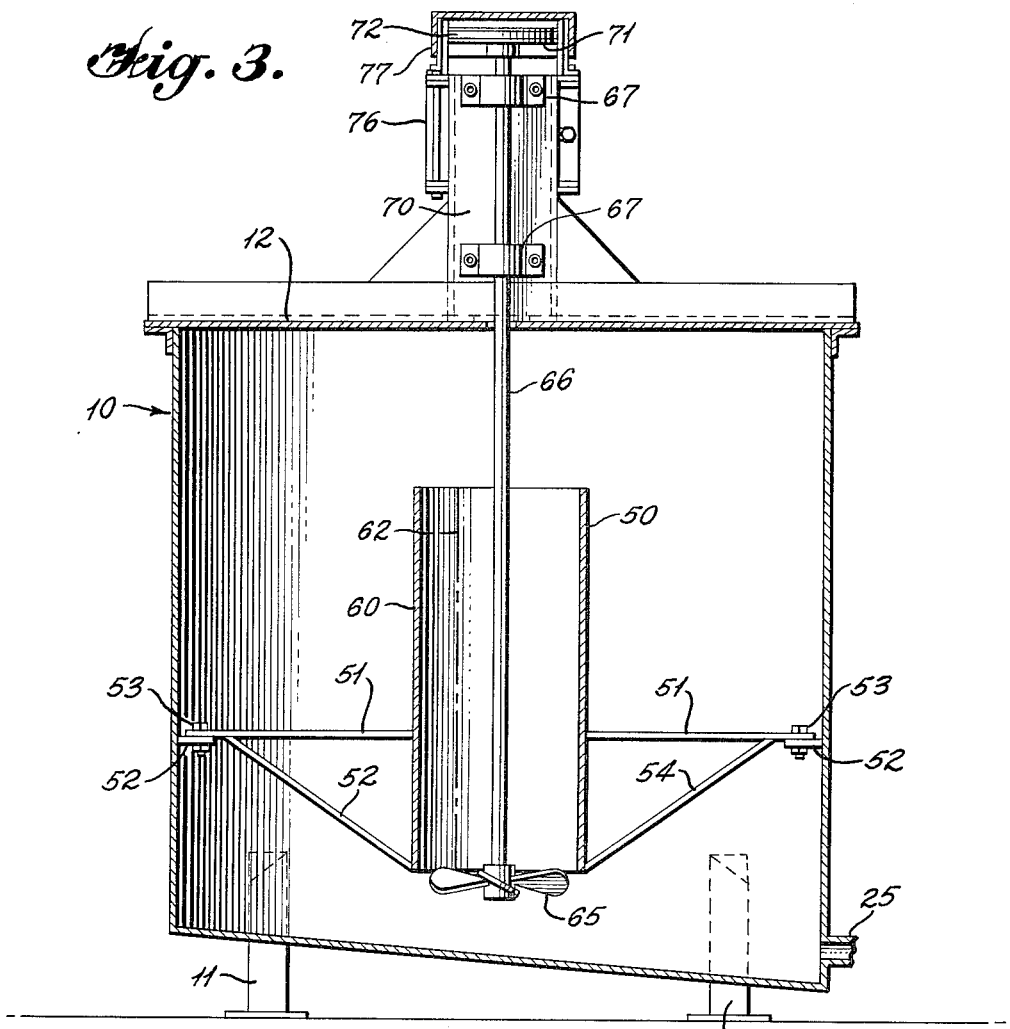
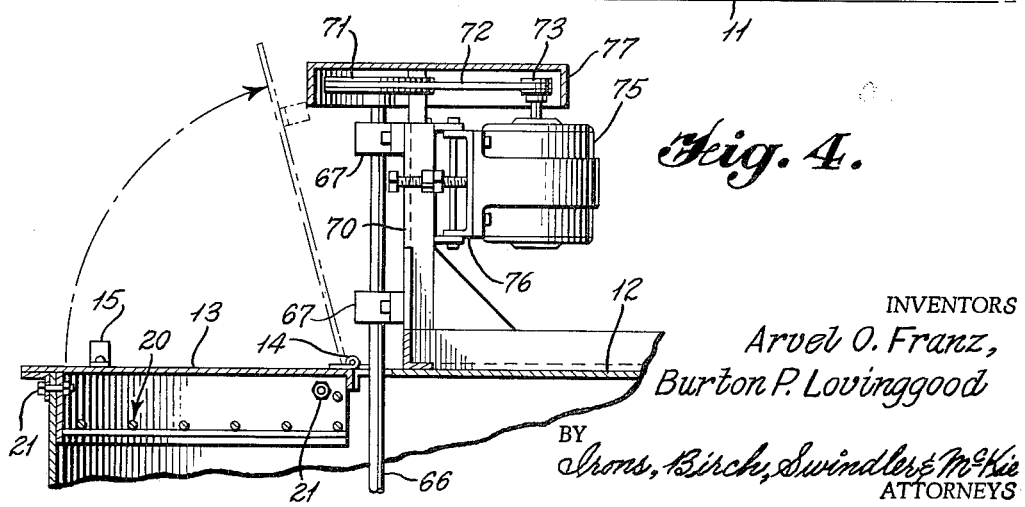

3,222,036
APPARATUS FOR PREPARATION OF SOLIDS IN
LIQUID DISPERSIONS
Arvel O. Franz, Box 465, Cartersville, Ga., and
Burton P. Lovinggood, Emerson, Ga.
Filed Feb. 7, 1963, Ser. No. 257,018
4 Claims. (Cl. 259—44)

This invention relates generally to the preparation of dispersions of particulate materials in liquids. More specifically, the invention relates to apparatus for the production of dispersions having a high concentration of solids in liquid resulting from a substantial quantity of particulate material being mixed with a relatively small volume of liquid.

There are many industry applications where finely divided solid material is mixed with a liquid to form a dispersion of the material within the liquid. This disperson may then be employed as a convenient method for introducing the material into the particular industry process involved. In applications where relatively small quantities of particulate material are mixed with a liquid, it is customary to use an agitator which imparts a top to bottom turn over between the liquid and material as the material is dumped into the liquid in a container. Various types of propeller or turbine type agitators, which tend to form the liquid and particulate material into a vortex path of movement as well as draft tubes or wall mounted stationary baffles disposed within the container have been used in prior attempts to promote mixing of the material into a liquid slurry.

The introduction of relatively small quantities of particulate material into a liquid to produce a thin slurry presents no serious problem with available mixing apparatus using the above mentioned components. On the other hand, adding substantial quantities of particulate material to a relatively small volume of liquid create special problems.

One specific application for the instant invention, that may be mentioned as making particularly good use of its advantageous features, involves the production of highly dense aqueous dispersions of barium carbonate made possible by the recent development of a specially formulated barium carbonate material. This dense dispersion offers a very convenient method for introducing the barium carbonate into the clay mixes used in forming ceramic products. In this connection, it may be briefly commented that water soluble sulfates are most undesirable in ceramic products because they tend to migrate to the product's surfaces and form a "scum." It has long been known that the addition of barium carbonate will effectively remove the sulfates as insoluble barium sulfates with the addition of as little as five pounds of barium carbonate per ton of clay mix often being sufficient to eliminate "scumming" entirely.

By employing the instant invention, dense dispersions are producible by using the recently perfected barium carbonate material with water. In this dense dispersion form, precisely controlled rates of introduction of barium carbonate into the clay mix can be obtained to thereby obviate previous problems in introducing the relatively small proportion of barium carbonate required, such problems arising when the barium carbonate tended to lump and was not easily dispersed in the large quantity of the clay mix.

To give an idea of the meaning of a dense dispersion as needed in the above mentioned technique for feeding barium carbonate to clay mixes, in this technique two tons of the dry powdered specially formulated barium carbonate material occupying a cubic volume of 73 cubic feet is discharged into 19 cubic feet of water to give a resulting highly dense dispersion having a volume of 38 cubic feet. This type of dense dispersion cannot be simply and rapidly produced by use of known presently available equipment.

The above mentioned figures have reference to a specific application in forming an aqueous dispersion of the above referred to improved barium carbonate material. Assuming a cylindrical mixing container approximately four feet in diameter and filled to a depth of 20 inches of water, the particulate material, such as in the form of this improved barium carbonate material is dumped on to the surface of the water. With a conventional agitator, about thirty 50-pound bags of this material may be rapidly added without any noticeable difficulty. Beyond this amount, the added material starts to float in increasingly large masses on the liquid surface, rather than sinking and being drawn down through the agitator and dispersed. In such circumstances, considerable manual labor and time are required to break up, with a paddle, lumps and large floating masses as they form.

Attempts to counteract this effect by increasing the agitating rate runs the risk of introducing air into the mixture such that the viscosity of the mixture is severely increased to a point where it assumes the texture of whipped cream. The addition of stationary baffles within the container merely provide anchors which hold the floating masses of material against movement and thus further retard the rate of formation of a dispersion as the solids to liquid ratio increases.

If a conventional draft tube is mounted over the agitator, the height of its upper end creates an added problem where a substantial quantity of particulate material is added to a relatively small quantity of liquid. If the upper end of the draft tube is too low, it has little or no value toward the end of the mixing operation since the surface level of the material will be too far above the tube end for floating masses to be drawn down into the tube by the agitator action. If the upper end of the tube is high enough to be of use toward the end of the dispersion producing operation, the upper end of the tube will protrude above the liquid at the early stages of dispersion production which then interferes with the agitation and dispersion at the beginning of the operation.

The instant invention solves the above discussed problems by providing apparatus wherein a substantial quantity of particulate material may be added to a relatively small volume of liquid with a resulting highly dense dispersion. Briefly, the invention involves apparatus wherein during addition of the particulate material to the liquid, the mixture is moved in a vortex flow path and incident to this movement, an inner portion of the mixture adjacent the center of the vortex is continuously separated and drawn downwardly at the vortex center for effective dispersion. Generally, the apparatus of the invention embodies a container for retaining the mixture of liquid and material as it is formed into a dispersion with an upstanding generally tubular member mounted within the container adjacent the center of the vortex that is formed in producing the dispersion. The tubular member embodies a vertical longitudinal slot with means along one edge of the slot formed to collect an inner portion from the swirling mixture and an agitator mounted adjacent the lower end of the member. Rotation of the agitator imparts the vortex flow path movement to the mixture and incident to the mixture moving in this path around the tube member, the means associated with the slot acts to separate an inner portion of the mixture guiding it into the member whereupon it is drawn downwardly through the member by the agitator's action.

It is a principal object of the instant invention to provide apparatus for the production of highly dense dispersions of particulate material in liquid.

It is another object of this invention to provide an apparatus wherein highly dense dispersions of particulate material in liquid can be rapidly and effectively produced despite lumps or floating masses of undispersed material that tend to accumulate on the surface of the liquid.

A further object in connection with the above objects resides in providing for feeding precisely controlled quantities of particulate material by the medium of control of the flow rate of a highly dense liquid dispersion of the material.

It is also an object of this invention to provide an improved mixing tube construction for use in apparatus to produce highly dense dispersions of particulate material in liquid.

The above and other objects and novel features of the instant invention will be apparent from the following description taken in connection with the accompanying drawings. It is to be expressly understood, however, that the drawings are for the purpose of illustration only and are not intended to define the limits of the invention but rather to illustrate a preferred embodiment and structure incorporating the features of the instant invention.

In the drawings wherein like reference characters refer to like parts throughout the several views:

FIGURE 1 is a plan view of the dispersion producing apparatus of this invention with parts broken away and in section to illustrate details thereof;

FIGURE 2 is a horizontal sectional view of the container in which the dispersion is produced and showing certain parts mounted internally thereof;

FIGURE 3 is a sectional view taken on line 3—3 of FIGURE 2; and

FIGURE 4 is a fragmentary sectional view showing certain parts mounted at the upper end of the container.

Referring to the several figures on the drawings, the apparatus for producing a dispersion of particulate material in a liquid embodies a container 10 which is supported in an upright position on suitable legs 11 as shown more clearly in FIGURE 3. The container 10 is shown as being cylindrical, although it will be appropriate that other container shapes may be employed to retain the liquid and particulate material as it is formed into a dispersion.

Container 10 has a cover 12 secured thereto which closes the major portion of the upper end of the container. A lid 13 hingedly connected at 14 to the cover 12 is provided to close the remaining portion of the upper end of container 10, a suitable handle 15 being provided on lid 13 to facilitate opening and closing of the lid. The lid 13 is opened and held in an open position during introduction of the particulate material to be formed into the dispersion within the container 10.

Immediately beneath the lid 13, there is provided a safety rack or grill 20. This grill is suitably supported as by bolts 21 on the inner wall of the container 10 and provides a series of spaced bars through which the particulate material may pass but which preclude inadvertent introduction of foreign matter or large lumps of material into container 10.

In the embodiment illustrated, the bottom of container 10 slopes toward a flanged outlet 25. As shown in FIGURE 1, outlet 25 is connected to a valve 26 which leads to a capped T 27. The cap 28 on T 27 may be removed as may be desired or necessary for draining or cleaning the container. A strainer (not shown) is preferably provided in T 27, accessible by removal cap 28.

The flanged outlet 25 also provides a passage for introducing the liquid into the container prior to formation of the dispersion therein. For this purpose, one connection of T 27 communicates through valve 29 with a water line 30 such that by opening valve 29 and valve 26, water from line 30 may be introduced into the container 10.

The other connection of T 27 is connected through a suitable hose 35 with the suction inlet of a pump 36. An appropriate electric motor 40 is connected through a variable speed reducer 41 to drive the pump 36 whereupon the dispersion will be withdrawn from container 10 through hose 35 and discharged through a pipe 45 to be conveyed to the desired point of use. Preferably, the pump 36 will be of a construction such that the rate of material flow therethrough will be in proportion to the speed of rotation of the pump. By using this type of pump, the variable speed reducer 41, whose speed range may be adjusted by knob 42 to change the ratio between the input and output shafts of the reducer, may be employed with a constant speed motor 40 to vary as necessary the rotative speed of pump 36 and, in turn, vary the rate of material delivered to discharge line 45.

This is an important aspect in the above discussed industry application wherein relatively small quantities of barium carbonate are to be introduced into a substantial volume of clay mix. By adjustment of the speed range between the input and output of reducer 41 through movement of knob 42, the rate of delivery of the barium carbonate dispersion to discharge pipe 45 can be accurately controlled so that the precise amount of barium carbonate for the particular clay mix will be provided.

Although it will be appreciated that various pump and speed reducer constructions can be employed, an example of one combination of these components found to be especially well suited includes a Moyno pump, produced by the Moyno Pump Division of Robbins & Myers, Inc., Springfield, Ohio and a Zero-Max variable speed drive, produced by the Zero-Max Company of Minneapolis, Minnesota.

Returning to a description of the structure associated with container 10 and by means of which the dispersion is rapidly and effectively produced, reference may be had to FIGURES 2 and 3 in particular. As shown in these figures, a generally tubular member 50 is mounted centrally and in an upstanding position within container 10. The mounting for member 50 includes brackets 51 which extend radially from adjacent the lower end of member 50 and are secured at their outer ends respectively to tabs 52 by means of bolts 53. Tabs 52 are, in turn, attached to the inner wall of container 10. As shown in FIGURE 3, the brackets 51 are braced by struts 54 to rigidly support the tubular member 50 in an upright position.

It may be pointed out that the brackets 51 and struts 54 are disposed such that they offer a minimum obstruction to the moving flow of the mixture of liquid and particulate material in a vortex path within the container 10. Thus, the supports for member 50 are in streamlined relation to the vortex flow path of movement introduced in the mixture by the agitator. Also, these supports are sufficiently low in the container as to not be in a position to anchor any floating masses. In applications where the instant invention finds most effective use, namely, where a substantial quantity of material is to be dispersed in a relatively small volume of liquid, the upper end of member 50 is desirably located at a level such that when the final portion of the particulate material is added, the surface level within the container will be only a short distance above the upper end of member 50.

The cross-sectional configuration of member 50 is best shown in FIGURE 2. Thus, the member has a slot extending longitudinally throughout its length. A wall 60 extends tangentially from one edge of the longitudinal slot in member 50 and terminates in an outer edge 61 which, together with the opposite edge 62 of the slot, forms an inlet opening 63 through which the mixture of liquid and material may pass into the tubular member 50. The position of edge 62 relative to wall 60 throughout the length of member 50 is shown by the phantom line identifying this edge on FIGURE 3. By reason of the relationship of the edges 61 and 62 shown on the drawing, the opening 63 lies in a plane generally perpendicular to the plane of the tangential wall 60. A description of the function of the slotted member 50 and tangential wall 60 may best be given following description of the agitator which is associated with the member.

It is to be understood that the member 50 need not be slotted throughout its entire length. However, it is preferable that a substantial portion of the length of member 50, lying between the top of the member and a point which is somewhat below the contemplated starting level for liquid to be used in forming the dispersion within the container, be slotted and this slotted length have a baffle wall 60 associated therewith. Also, although a single slot and associated baffle wall has been illustrated, it is contemplated within the scope of the invention that a plurality of associated slot and wall inlet openings may be provided at circumferentially spaced positions on member 50.

To agitate the mixture of liquid and particulate material, a rotary agitator 65, which, as illustrated, may take the form of a marine type propeller, is mounted on the lower end of a shaft 66 which shaft extends centrally through the tubular member 50 and cover 12 above which it is journaled in bearings 67. The bearings 67 are secured to an upstanding frame 70 mounted on the top side of cover 12.

A pulley 71 is fastened on the upper end of shaft 66 and coupled through a belt 72 to a pulley 73 secured on the drive shaft of a motor 75. Motor 75 is carried by frame 70 on a suitable motor mounting bracket 76. A cover 77 mounted on the upper end of frame 70 is provided to enclose the pulleys 71 and 73 and belt 72.

From the construction described above, it will be apparent that energization of motor 75 will impart rotation to shaft 66 which, in turn, will rotate agitator 65 disposed adjacent to the lower end of member 50. It is intended that, with the formation of tube member 50 as shown on FIGURE 2 the agitator 65 be driven in a direction as indicated by arrow A on FIGURE 2. In rotating in this direction, the agitator will tend to impart movement to the liquid in container 10 such that the liquid will commence to move in a vortex flow path in a clockwise direction as viewed in FIGURE 2. As the liquid moves in this vortex flow path and as particulate material is supplied to the surface of the body of liquid, the wall 60 associated with the slotted member 50 will cause an inner portion of the mixture to be separated and moved into the member 50. This separated portion will embrace a segment of the moving mixture extending throughout the length of member 50.

The rotation of agitator 65 not only acts to set up movement of the liquid and material in a vortex flow path but also with a propeller type agitator, having the relationship of the blades to the direction of rotation as shown on the drawings, will tend to draw the mixture within member 50 downwardly and through the agitator. Thus the separated portion which enters member 50 is drawn downwardly therein such that the liquid and particulate material are intimately commingled to promote formation of the dispersion.

In the preferred embodiment illustrated, the propeller type agitator 65 performs both the function of imparting movement to the mixture to produce the vortex flow path and continuously separate a portion from the path into the member 50, and also acts to draw the mixture downwardly within the member 50. It will be appreciated that within the scope of the instant invention these two functions may be performed by separate devices.

It will be seen that, by providing the wall 60 extending outwardly from the slot in member 50, this wall in effect forms a baffle which is directed against the vortex path of movement of the liquid and material mixture in the container. Where repeated additions of particulate material to the surface of the liquid results in floating masses of the material, a part of the liquid and these floating masses will be guided into the member 50 where the flow of liquid and material will be downward under the influence of the agitator. At the bottom of member 50, adjacent the agitator 65, there is a zone of more violent agitation, which is effective to disperse remaining masses of particulate material but not so violent as to break material-entrained air into small bubbles that could then become more or less entrapped in the final product. Should such over violent agitation occur, the entrapped small bubbles could produce an undesirable very viscous whipped cream like dispersion.

In the use of the apparatus discussed hereinabove, an appropriate quantity of liquid is introduced to container 10 as by use of line 30 and flanged outlet 25. Agitator 65 is placed in operation by energizing motor 75 to induce a vortex flow path in the liquid.

The dry particulate material is discharged onto the surface of the material through grill 20 as rapidly as may be desired. Should floating masses of material develop, they are carried by the vortex flow path movement of the liquid toward the center of this vortex path such as is characteristic for objects floating on the surface of a swirling body of liquid. As they approach the center of the vortex, the baffle wall 60 in effect, slices off the edge of the floating masses and guides it into member 50 where the flow is moving downwardly. Upon entering the agitating zone adjacent the bottom of member 50, the material is effectively dispersed with the liquid. As the last of the material is added through grill 20, the level in the container will have risen such that a portion of the floating material can go over the upper end and downwardly through the member 50 under the action of the rotating agitator 65.

Once the desired dispersion has been produced, which, by reason of the action described above, is unimpeded by having to delay the rate of discharge of the material into the container, the speed of agitator 65 may be reduced and a lower rotative speed continued with substantially reduced power requirements to maintain the dispersion in a flowable state. Thus, motor 75 will desirably be of two speed design such that high speed agitator action may be used during the dispersion producing operation and thereafter low speed agitator rotation employed and corresponding lower power requirements used to maintain agitation of the dispersion pending its use.

Once the dispersion has been formed, valve 26, which remains closed during production, is opened and motor 40 is energized to drive pump 36. Depending upon the flow rate requirements for the dispersion needed for the particular industry operation involved, the speed of pump 36 and consequently the flow rate through pipe 45 may be adjusted precisely by regulation of speed reducer 41 by means of knob 42.

While a certain present preferred embodiment of the invention and adaptations thereof have been shown and described, it is to be distinctly understood that the invention is not limited thereto but may be otherwise variously embodied and practiced within the scope of the following claims.

We claim:
1. Apparatus for producing a dispersion of particulate material in liquid comprising
   a container for liquid to have particulate material introduced therein to form the dispersion,
   a member supported within said container to provide a generally vertical passage therethrough,
   means associated with said member adjacent the lower end thereof operable to induce flow of the liquid into a vortex path of predetermined direction and to draw liquid downwardly through said passage,
   said member having an elongated upstanding inlet opening communicating with said passage, and
   baffle wall means associated with said inlet opening to direct liquid moving in said predetermined direction into said opening and into said passage.
2. Apparatus for producing a dispersion of particulate material in liquid comprising a container for liquid to have particulate material introduced therein to form the dispersion, a generally tubular member supported substantially vertically within said container, said member having a slot extending longitudinally thereof, baffle wall means extending outwardly from one longitudinal edge of said slot with the outer edge of said baffle wall means and the opposite edge of said slot defining an inlet opening for liquid and material facing in a predetermined direction, means associated with said container operable to induce flow of the liquid into a vortex path having a direction of movement to propel a portion of the liquid and material into said inlet opening and to draw liquid downwardly through said tubular member.

3. Apparatus for producing a dispersion of particulate material in liquid comprising a container for liquid to have particulate material introduced therein to form the dispersion, a generally tubular member supported substantially vertically within said container, said member having a slot extending longitudinally thereof, baffle wall means extending outwardly generally tangentially from one longitudinal edge of said slot to form an inlet opening, an agitator mounted to rotate about a substantially vertical axis and disposed adjacent the lower end of said member, means for rotating said agitator to cause the liquid and material to move in the form of a vortex which has a direction such that a portion of the liquid and material passes through said inlet opening and into said tubular member and is drawn downwardly through said tubular member.

4. Apparatus as recited in claim 1 further comprising an outlet communicating with the interior of said container, a pump providing substantially constant flow rate in proportion to its driven speed, and variable speed drive means connected to drive said pump whereby the flow rate of the dispersion to the point of use may be precisely controlled by changes in the speed of said drive means.

References Cited by the Examiner
UNITED STATES PATENTS

| | | | |
|---|---|---|---|
| 17,646 | 6/1857 | Taylor | 259—97 |
| 692,774 | 2/1902 | Appleby | 259—7 |
| 1,268,813 | 6/1918 | Benjamins | 259—8 |
| 1,386,503 | 8/1921 | Hulst et al. | 259—7 |
| 1,720,573 | 7/1929 | Roberts | 259—8 |
| 1,735,395 | 11/1929 | Hiller | 259—10 |
| 1,973,274 | 9/1934 | Wedge | 259—10 |
| 1,982,002 | 11/1934 | Hatch | 259—7 |
| 2,570,310 | 10/1951 | Bogen | 259—134 |
| 2,646,975 | 7/1953 | Waldvogel | 259—149 |
| 2,993,355 | 7/1961 | Forsberg | 68—208 X |
| 3,018,650 | 1/1962 | Schmidt | 68—208 X |

FOREIGN PATENTS 921,537 1/1947 France.

IRVING BUNEVICH, *Primary Examiner.*